United States Patent [19]

Hannon

[11] 4,345,491

[45] Aug. 24, 1982

[54] TRANSMISSION UTILIZING VELOCITY CONTROL MECHANISM

[76] Inventor: Gilbert H. Hannon, 1232 Elizabeth St., Green Bay, Wis. 54308

[21] Appl. No.: 161,001

[22] Filed: Jun. 19, 1980

[51] Int. Cl.³ .................... F16H 19/06; F16H 35/08
[52] U.S. Cl. ........................................ 74/831; 74/37
[58] Field of Search ............... 74/37, 52, 110, 828, 74/831

[56] References Cited

U.S. PATENT DOCUMENTS

| 1,097,333 | 5/1914 | Kinmont et al. | 74/37 |
| 2,564,816 | 8/1951 | Rehwald | 74/37 |
| 2,593,470 | 4/1952 | Matthews et al. | 74/37 |
| 3,293,927 | 12/1966 | McClean | 74/37 |

FOREIGN PATENT DOCUMENTS

| 486889 | 11/1929 | Fed. Rep. of Germany | 74/52 |
| 1027307 | 2/1953 | France | 74/52 |

OTHER PUBLICATIONS

Product Engineering, "5 Cardan-Gear", by S. Rapparort, vol. 30, pp. 66-67, Sep. 28, 1959.

Primary Examiner—Lawrence J. Staab
Attorney, Agent, or Firm—Warren F. B. Lindsley

[57] ABSTRACT

A mechanism for controlling the velocity of a tool platform in a manner causing the platform to follow a moving product at product speed while machine operations are performed on the product. The mechanism comprises a platform reciprocally driven by a roller chain coupled to a slot in the platform, the orientation of the roller chain being altered to control the velocity and distance of travel of the platform.

3 Claims, 6 Drawing Figures

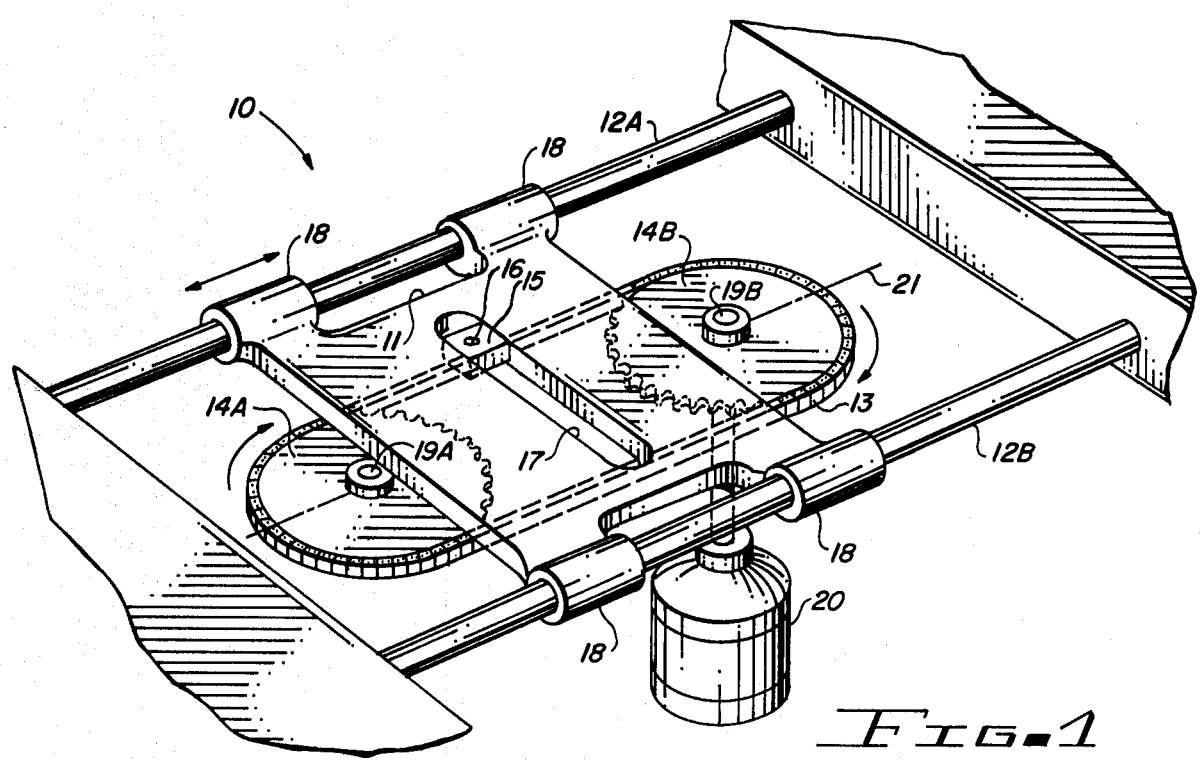
FIG.-1
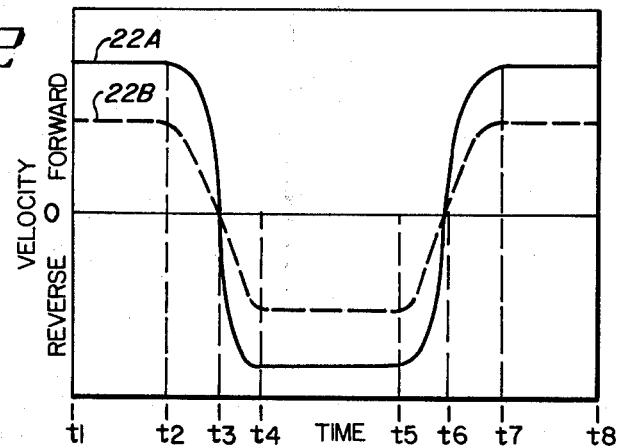
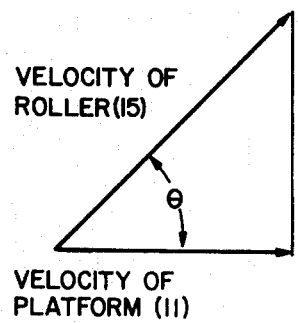
FIG.-4
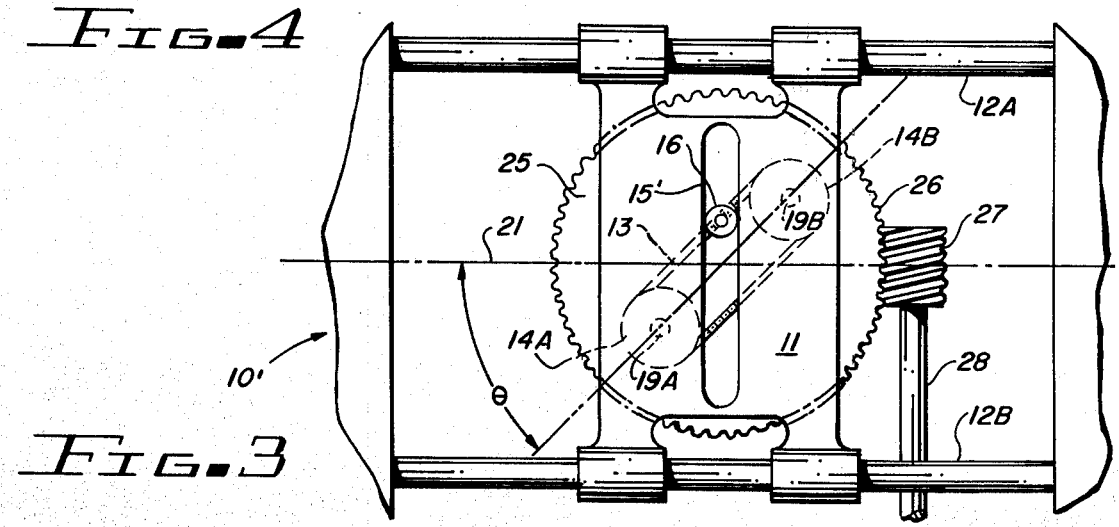
FIG.-3

TRANSMISSION UTILIZING VELOCITY CONTROL MECHANISM

BACKGROUND OF THE INVENTION

This invention relates to transmissioner mechanisms and more particularly, to means utilizing a velocity control drive for obtaining accurately controlled repetitive cycles of operations.

In many machine applications, it is necessary to perform work functions on a product as it is moved continuously at relatively high speed through a machine. During the portion of the cycle time in which the work function is being performed, it is frequently essential that the machine element in contact with the product be transported at the precise velocity of the product.

Examples of operations of this nature include the heat sealing, cutoff and labeling functions of bag making or packaging machinery. Another example is a flying cutoff in plastic extrusion machinery or, more specifically, a wire harp cutoff for the cutting of continuously moving stacked endless ribbons of processed cheese into desired lengths of finished product.

For practical and economic reasons, it is preferable that the velocity of the work element during its contact time with the product be adjustable to accommodate a range of product sizes or spacing. A stepless adjustment over a broad range is also desirable.

Features of the nature just described are not ordinarily available in relatively simple and inexpensive machines, but the importance and utility of such a mechanism for the packaging industry and for similar applications is quite apparent.

DESCRIPTION OF THE PRIOR ART

Transmission mechanism of the prior art are large in size, expensive to operate and lack the efficiency now possible with modern equipment. In order to satisfy the demands of industry for a simple mechanical drive for a tool support or platform at a continuously adjustable velocity which permits the tool or platform to be moved with a moving product during a portion of its cycle, a new and improved velocity control drive must be provided.

No pertinent prior art is known other than U.S. Pat. Nos. 2,456,282; 2,617,307; 2,803,226; 2,881,628 and 3,043,156. These patents disclose controlling mechanisms for tool holders of a machine tool with some of them disclosing variable speed repetitive cycles, but none are believed to be pertinent to or anticipatory of the claimed invention.

U.S. Pat. No. 2,546,282 merely discloses variable speed gearing.

U.S. Pat. No. 2,617,307 discloses an adjustable lead control for threading machines in which the threading die is moved axially toward and away from the work piece.

U.S. Pat. No. 2,803,226 discloses a tool holder in a thread cutting machine in which the movement of the tool carrying slide is obtained by means of a conventional cam assuming a continuous rotary movement.

U.S. Pat. No. 2,881,628 discloses a transmission mechanism employing a pivotally mounted rotatable disc means for controlling speed variations.

U.S. Pat. No. 3,043,156 discloses a mechanism using a constant speed drive for obtaining a variable speed repetitive cycle of operation. The invention claimed herein is directed to a much simpler, less expensive, smaller and more efficient device for accompanying a similar function to that disclosed in this patent.

SUMMARY OF THE INVENTION

In accordance with the invention claimed, an improved velocity control mechanism is provided. The mechanism drives a tool support or platform at a continuously adjustable velocity which permits the platform to be moved with a moving product during a portion of the operating cycle.

It is, therefore, one object of this invention to provide an improved velocity control mechanism for use in automatic machinery.

Another object of this invention is to provide in such a mechanism a means for adjusting in a continuous or stepless manner the velocity of a tool support or platform associated with the automatic machinery.

A further object of this invention is to provide in such a velocity control mechanism a capability for driving a tool platform in a cyclic manner whereby the platform is made to follow the moving product at product velocity during a portion of the machine cycle or over a given part of the product route.

A further object of this invention is to provide such a capability at very high machine speeds and product velocities.

A further object of this invention is to provide in such a mechanism a means for adjusting the platform velocity while the machinery and the mechanism are in operation.

A further object of this invention is to provide such a mechanism in a form that is adaptable to accommodate a broad range of product size or spacing on the conveyor.

A further object of this invention is to provide such a mechanism in a form that may be adapted to control elements of a reciprocating machine or to control velocity during contact time of continuously rotating machine elements.

A still further object of this invention is to provide such a velocity control mechanism in a relatively simple form so that its initial and maintenance costs will be minimized.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which:

FIG. 1 is a simplified schematic representation of the velocity control mechanism of the invention;

FIG. 2 is a velocity diagram showing the controlled velocity with its variations through a complete machine cycle;

FIG. 3 is a schematic or simplified plan view of the velocity control mechanism showing additional mechanical features of the mechanism;

FIG. 4 is a vector diagram relating platform velocity to the velocity of another element of the mechanism as a function of a variable angle $\theta$.

DESCRIPTION OF THE PREFERRED EMBODIMENT

Figure 5:
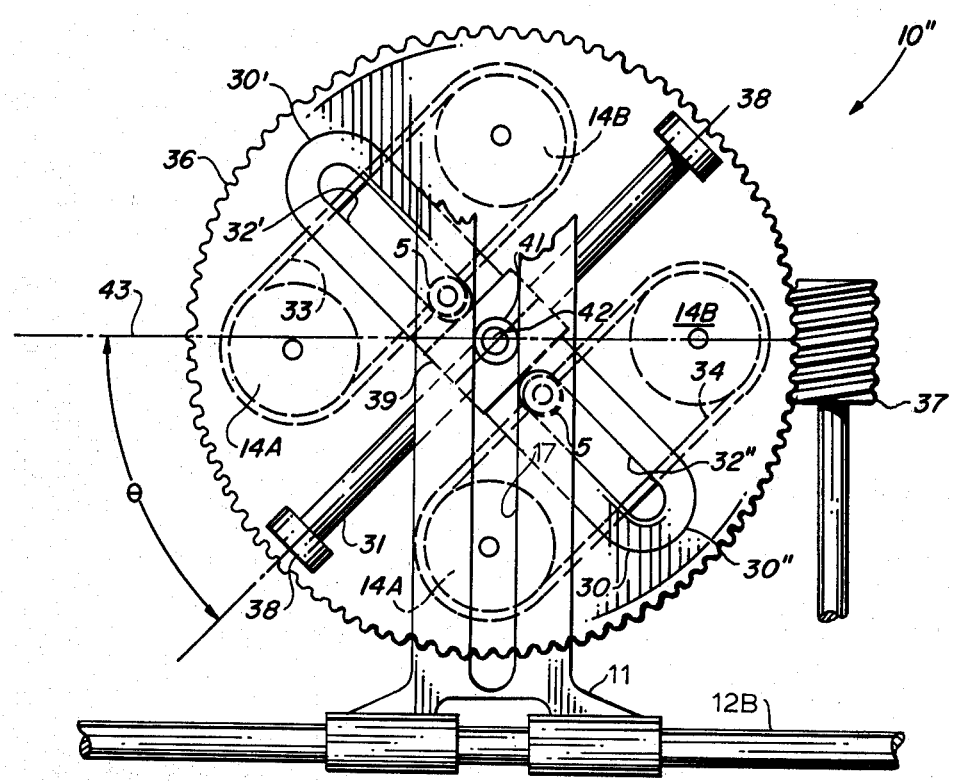
FIG. 5 is a simplified plan view of a second embodiment of the invention.

Referring more particularly to the drawing by characters of reference, FIG. 1 discloses a transmission employing a velocity control drive or mechanism 10 comprising a controlled tool drive such as, for example, a rigid planar member or tool platform 11 slidably mounted on a support disclosed herein as parallel guide rods 12A and 12B, an endless roller chain 13 mounted on sprockets 14A and 14B, and a following means such as a roller or block 15 mounted on an extended pin 16 of chain 13. As shown in FIG. 1, block 15 is engaged in a slot 17 in platform 11.

Platform 11 is generally flat and rectangular with a sliding coupling 18 at each of its four corners. The coupling 18 partially surrounds rod 12A and 12B and is fashioned to grip the rod but with freedom to slide along the length of the rod. Platform 11 spans the separation between the parallel rods 12A and 12B, and slot 17 extends centrally across platform 11 with a perpendicular orientation relative to rods 12A and 12B.

Sprockets 14A and 14B which are shown as being equal in diameter for clarification purposes with their diameters less than the spacing between the rods 12A and 12B may be, in some instances different in diameter from each other to satisfy unusual velocity requirements. The axes 19A and 19B of sprockets 14A and 14B, respectively, are parallel to each other and perpendicular to platform 11. These sprockets lie in a plane that is parallel to the plane defined by rods 12A and 12B. The plane of sprockets 14A and 14B is thus also parallel to platform 11, and it lies just behind or below platform 11 so that the extended pin 16 and block 15 extend through slot 17. The width of block 15 is slightly smaller than the width of slot 17 so that the block is free to move or slide in either direction along the length of slot 17.

One or the other of sprockets 14A and 14B is driven by a drive member which may be, for example, an electric motor 20. As chain 13 is carried around sprockets 14A and 14B, block 15 is carried about the path defined by chain 13. Assuming rotation of sprockets 14A and 14B to be clockwise as shown in FIG. 1, block 15 will move initially to the right from the instant position shown along a path that is parallel with rods 12A and 12B. The engagement of block 15 with slot 17 causes the platform 11 to be carried along to the right as it slides along the rods 12A and 12B. As pin 16 and block 15 reach the twelve o'clock point of sprocket 14B, they begin a circular path that carries them around sprocket 14B to its six o'clock point. From there they move leftward along a path that is again parallel with rods 12A and 12B. After reaching the six o'clock point of sprocket 14A, pin 16 and block 15 pass around sprocket 14A to its twelve o'clock point and then resume a path parallel to rods 12A and 12B moving once more to the right. As the rollers pass around the sprockets 14A and 14B, they must obviously move in a direction that has a component perpendicular to rods 12A and 12B. This perpendicular motion of pin 16 and block 15 is accommodated by the movement of block 15 along the length of slot 17. Thus, as block 15 passes around sprocket 14A, it moves upward in slot 17 and as it passes around sprocket 14B, it passes downward to slot 17. Because the absolute velocity of chain 13 is normally constant during a given traversal of roller 15 about the path just described, platform 11 is carried to the right or to the left at a constant velocity except during the time block 15 passes around sprocket 14A and 14B. During the first ninety degrees of rotation about sprocket 14A or 14B, platform 11 decelerates to zero velocity. It then accelerates in the opposite direction during the remaining ninety degrees.

The velocity diagram of FIG. 2 illustrates the velocity patterns just described. The two waveforms shown in FIG. 2 represent two orientations of the sprockets 14A and 14B relative to the centerline 21 shown in FIG. 1. Centerline 21 is parallel with rods 12A and 12B. When the axes 19a and 19B, respectively, of sprockets 14A and 14B lie along lines 21, as shown in FIG. 1, waveform 22A applies. Waveform 22B applies when axes 19A and 19B lie along a line that is displaced from line 21 (an arrangement yet to be described with FIG. 3).

In FIG. 2, the vertical axis represents velocity of work platform 11 and the horizontal axis represents time progress from left to right. A horizontal line represents uniform velocity and displacement from the horizontal line represents acceleration or a change in velocity. Velocity above the 0 line is positive or forward and below is negative or reverse.

Examining waveform 22A, it is noted that velocity, i.e., the velocity of platform 11, is first constant and positive during the period T1 to T2; the block 15 is moving from its instant position shown in FIG. 1 to the right toward its point of contact with sprocket 14B. At time T2, block 15 is at the twelve o'clock point to the three o'clock point of sprocket 14B and during this time, the platform decelerates from its maximum forward velocity to zero velocity at time T3. The deceleration occurs as a simple harmonic deceleration. During the period T3 to T4, the block 15 moves from the three o'clock point to the six o'clock point of sprocket 14B and platform 11 experiences simple harmonic acceleration in the reverse or negative direction, achieving a maximum reverse velocity at time T4. During the period T4 to T5, the maximum reverse velocity is sustained as block 15 moves from the six o'clock point of sprocket 14B to the six o'clock point of sprocket 14A. The maximum reverse velocity has the same absolute magnitude as the maximum forward velocity sustained during the period T1 to T2. During the period T5 to T6, the platform decelerates to zero as block 15 moves from the six o'clock to the nine o'clock position of sprocket 14A (again in a simple harmonic manner) and during the period T6 to T7, it accelerates in the forward direction as block 15 moves from the nine o'clock to the twelve o'clock position, reaching maximum forward velocity at T7. During the period T7 to T8, the maximum forward velocity is sustained as block 15 moves from the twelve o'clock position of sprocket 14A to the instant position shown for block 15 in FIG. 1. The period T1 to T8 represents a complete machine cycle or one complete rotation of the roller chain 13 about the sprockets 14A and 14B.

It is thus seen that for each complete revolution of the chain 13, platform 11 is moved forward a distance equal to the overall dimension of the chain and sprocket assembly after which it is returned an equal distance in the reverse direction. Because the transitions from forward to reverse and forward again are achieved through simple harmonic deceleration and acceleration, the operation is smooth and free from shock and vibrations even at high speeds.

Accordingly, a machine element or tool such as a heat sealer, cutoff, labeler or code dater can be secured to platform 11 and transported for a period of time at the identical speed of a product while work is performed on the product. The distance of travel at constant velocity during the work period is, or course, equal to the distance between the sprocket axes 19A and 19B.

The speed control mechanism 10' of FIG. 3 incorporates all of the elements of FIG. 1 except block 15 is replaced by roller 15'. It should be noted that block 15 may be utilized, as in FIG. 1, or not as desired. In addition, FIG. 3 provides for the mounting of the chain and sprocket assembly (13, 14A and 14B) on a turntable 25. The circular turntable 25 is rotatably mounted at its center and it is fitted with worm gear teeth 26 about its circumference. Engaging the teeth 26 is worm 27 on an adjustment shaft 28. Manual or motorized rotation of adjustment shaft 28 causes turntable 25 to be rotated about its axis so that the chain and sprocket assembly 13, 14A and 14B may be turned from its parallel alignment with line 21 and with rods 12A and 12B. As shown in FIG. 2, the longitudinal axis 29 of the roller chain assembly has been displaced from line 21 (and from rods 12A and 12B) by an angle $\theta$.

In accordance with the vector diagram of FIG. 4, the resultant uniform velocity of platform 11 becomes a function of the cosine of the angle $\theta$. Thus, if the chain speed is given as V, the platform speed for a given angle $\theta$ is equal to $V \cos \theta$. Further, the distance travelled during the period of constant velocity is also a function of $\cos \theta$. If the distance between the sprocket axes 19A and 19B (pitch of chain 13) is given as D, the distance of constant-velocity travel is equal to $D \cos \theta$. At an angle $\theta$ of 45 degrees, the corresponding velocity is 0.707 V and the travel distance is 0.707 D. As the turntable 25 is rotated beyond 45 degrees, the forward travel of platform 11 during the period of constant velocity is further reduced, reaching zero when $\theta$ becomes 90 degrees.

Referring once more to FIG. 2, the waveform 22B represents the velocity of platform 11 for a 45 degree displacement of roller chain assembly 13, 14A and 14B from rods 12A and 12B. It will be noted that the maximum forward and reverse velocities are reduced from the maximum velocities of waveform 22A by a factor of 0.707 i.e., cos 45 degrees. Transitions between maximum forward and reverse velocities are again achieved through simple harmonic deceleration and acceleration.

Referring again to FIG. 3, it will be noted that as $\theta$ approaches 90 degrees, the time during which the platform 11 moves at constant velocity remains the same but the distance moved at constant velocity approaches zero. At $\theta=90$ degrees, there is no period of constant forward or reverse velocity, but platform 11 continues to move reciprocally a distance equal to the diameter of sprocket 14A or 14B. For small product lengths or spacings, the excessive travel due to sprocket diameter can be objectionable.

The velocity control mechanism 10'' of FIG. 5 eliminates the motion corresponding to sprocket diameter through the use of an additional slide rod assembly comprising a slide bracket 30 and a guide rod 31. Although a single roller chain assembly could be employed, a pair of roller chain assemblies 33 and 34 are utilized. A turntable 36 positioned by a worm 37 is employed in the same manner as described earlier with reference to FIG. 3. The guide rod 31 is secured to turntable 36 by means of two end brackets 38. Slide bracket 30 is slidably mounted by means of a centered sliding coupling 39 to guide rod 31. Bracket 30 extends outward from both sides of coupling 39 perpendicularly from guide rod 31. Both such extensions 30' and 30'' are slotted longitudinally. The slot 32' of extension 30' carries a roller 5 of roller chain assembly 33 while slot 32'' of extension 30'' carries a roller 5 of roller chain assembly 34. A roller 41 mounted on a pin 42 extending from coupling 39 operates in the slot of a tool platform (not shown in FIG. 5) of the type described earlier in connection with FIGS. 1 and 3. The slot of the tool platform and the motion of the tool platform are aligned with horizontal line 43.

As in the case of the arrangement of FIG. 3, the turntable 36 of FIG. 5 is rotated about its axis by means of worm 37. In this case, the guide rod 31 has been positioned at an angle $\theta$ relative to line 43. The roller chains 33 and 34 are made to rotate at equal speeds but in opposite directions. Thus, if chain 33 rotates in a counter-clockwise direction, the rotation of chain 34 is clockwise. Such rotation of chains 33 and 34 carries their respective rollers 5 toward the elevated ends of the two roller chain assemblies 33 and 34 where both the rollers 5 begin their passage simultaneously around their respective sprockets 14B. At this time, both rollers 5 move outward inside slots 32' and 32''. As the bracket 30 is moved thusly along guide rod 31, the roller 41 rides in the slot of the tool platform 11 (not shown in FIG. 5) moving the tool platform in a horizontal direction along line 43, the displacement of the tool platform corresponding to the horizontal component of the displacement of bracket 30 along guide rod 31.

Again, as the angle $\theta$ approaches 90 degrees, the displacement of the platform at constant velocity approaches zero and is again proportional to the cosine of the angle $\theta$. In this case, however, there is no displacement when $\theta$ is equal to ninety degrees. The objectionable feature of the arrangement of FIG. 3 in the case of small product spacings is thus effectively eliminated.

It should be noted that although rollers 5 and 41 have been utilized, a block configuration such as block 15 of FIG. 1 may be utilized in place thereof and still fall within the scope of this invention.

Accordingly, the size range for the mechanism shown covers a product length or spacing from a minimum of zero to a maximum equal to the overall pitch length of the chain 13. Although there are practical limitations, the pitch length of the chain may be selected almost at will to match the desired maximum product spacing.

It is possible to eliminate one or the other of the roller chain assemblies 33 or 34 without altering the operation of the mechanism 10'' of FIG. 5. The two roller chain assemblies, however, are useful in balancing the loading of the mechanism and in increasing the load carrying capacity.

Figure 6:
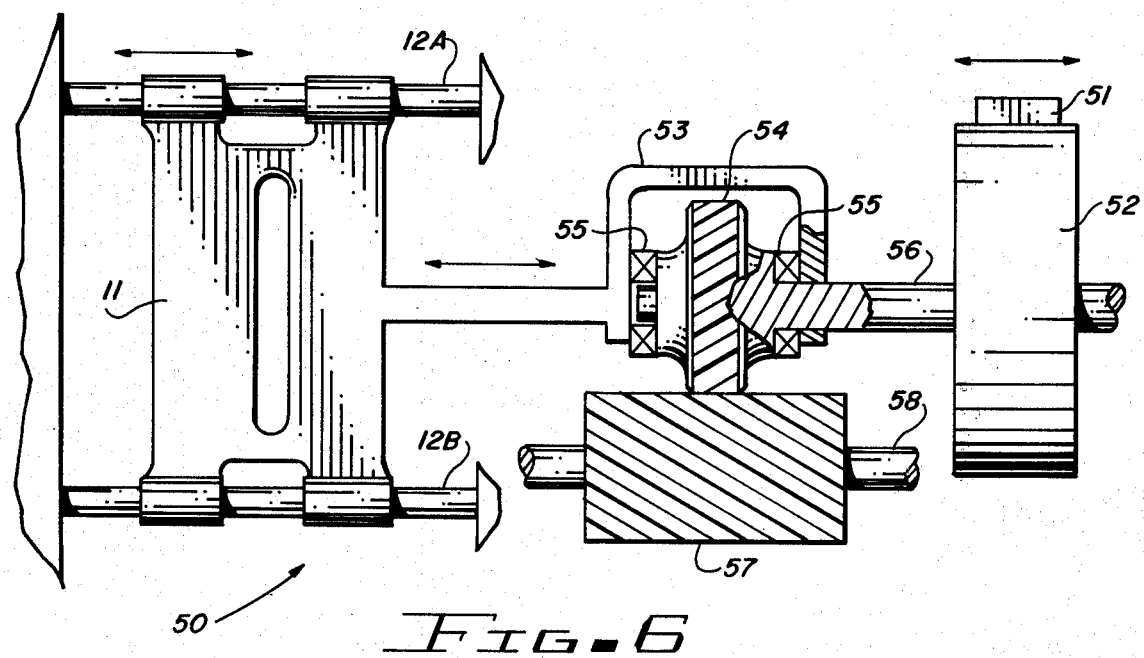
FIG. 6 is a simplified schematic showing the coupling of the velocity controlled platform to a tool associated with continuously rotating machine elements.

In the apparatus 50 of FIG. 6, a working head 51 mounted on a drum 52 is coupled to a tool platform 11 that is reciprocally driven by the velocity control mechanism of the invention. The coupling means comprises a yoke 53 secured to platform 11. Mounted inside yoke 53 is a helical gear 54 with thrust surfaces or bearings 55 at both ends. The axis of gear 54 is aligned with the direction of motion of platform 11. Gear 54 is slidably mounted on a shaft 56 with splines or keys that cause shaft 56 to turn with gear 54. Shaft 56 is secured directly to drum 52. Drum 52 and shaft 56 are thus constrained to turn with gear 54.

Wide-faced helical gear 57 mounted on a shaft 58 is engaged with gear 54. Shaft 58 is driven by a motor or other rotational drive means. The speed of rotation of shaft 58 and gear 57 is such that one rotation of gear 57 corresponds to one cycle of machine operation.

The ratio between gears 54 and 57 is unity so that when platform 11 is at rest, both gears turn at the same speed. When platform 11 is moved back and forth in a reciprocating manner under the control of the velocity control mechanism of the invention, the speed of rotation of gear 54 is increased or decreased by an amount proportional to the velocity of platform 11. The speed of rotation of shaft 56, drum 52 and working head 51 may thus be caused to speed up or slow down to a desired constraint velocity during the period of time in which the working head 51 is in contact with the moving machine product.

Other devices may be employed to couple the working head to the platform 11 to achieve similar or equivalent results, i.e., tool operation may be controlled as well as tool positioning.

It will be recognized that in the various embodiments of the invention, i.e., in mechanisms 10, 10' and 10" of FIGS. 1, 3 and 5, respectively, for any given chain length and sprocket diameter, the available constant velocity work performing time is a fixed prcentage of the machine velocity time regardless of the degree of the adjustment to angle θ. For example, if the uniform velocity time is 30% of the cycle time required for one full revolution of the chain, the available time to perform the work function will be the same regardless of the adjustment of angle θ. If the basic machine is operating at 120 cycles per minute or 0.50 seconds per cycle, the available work performing time will be (0.30×0.50)=0.15 seconds regardless of a product length or spacing of 0 or equal to the full length of the chain.

An effective and versatile velocity control mechanism is thus achieved in accordance with the stated objects of the invention. Although but a few embodiments of the invention have been illustrated and described, it will be apparent to those skilled in the art that various changes and modifications may be made therein without departing from the spirit of the invention or from the scope of the appended claims.

What is claimed is:

1. A transmission employing a velocity control device comprising:

a support, a slotted tool actuating platform mounted for reciprocal movement on said support, drive means mounted adjacent said platform and connected thereto for causing reciprocal movement of said platform, said drive means comprises a pair of sprocket means each having an endless means mounted thereon for movement thereby upon rotation of the associated sprocket means, a pair of following means one mounted on each of said endless means for movement therewith, a support rod, a slide bracket laterally positioned across said rod for slidable movement along said rod, a pair of spacedly positioned axially aligned slots formed in said bracket to extend longitudinally thereof, each of said slots loosely engaging a different one of said following means for causing said bracket to be reciprocally moved along said support rod over a portion of the travel of said endless means and to be relatively stationary during a second portion of the travel of said endless means when said following means moves along said slots, and a roller mounted on said bracket for riding in the slot of said platform for moving said platform in a simulating manner.

2. The transmission set forth in claim 1 wherein:

said slots are closed ended slots.

3. The transmission set forth in claim 1 in further combination with:

a turntable for supporting said rod, and means for adjustably rotating said turntable relative to said platform.

* * * * *